H. S. HATFIELD.
ELECTRODE FOR ELECTROLYTIC MEASURING INSTRUMENTS.
APPLICATION FILED JUNE 28, 1913.
1,111,898.
Patented Sept. 29, 1914.
FIG. I.
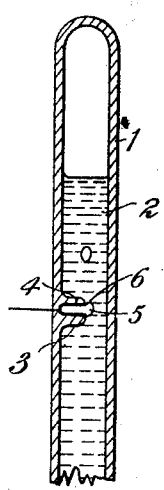
FIG. II.
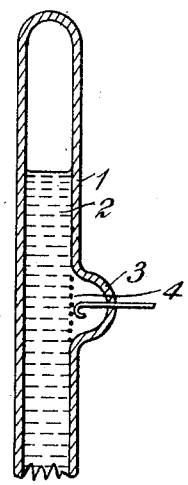
FIG. III.
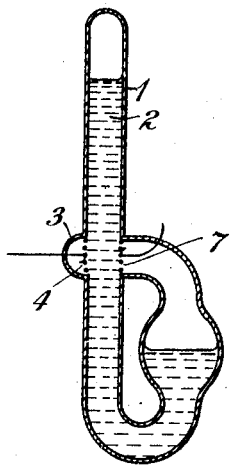
Witnesses.
Frederick Kunz
H. M. Bayles
Inventor.
Henry S. Hatfield
by Gustav Bisang
Attorney

UNITED STATES PATENT OFFICE.

HENRY STAFFORD HATFIELD, OF BRUNSWICK, GERMANY.

ELECTRODE FOR ELECTROLYTIC MEASURING INSTRUMENTS.

1,111,898. Specification of Letters Patent. Patented Sept. 29, 1914.

Application filed June 28, 1913. Serial No. 776,235.

*To all whom it may concern:*

Be it known that I, HENRY STAFFORD HATFIELD, of Herzogin Elizabethstrasse 23, Brunswick, Germany, electro-chemist, have invented certain new and useful Improvements in or Connected with Electrodes for Electrolytic Measuring Instruments, of which the following is a specification.

My invention relates to electrodes for electrolytic measuring instruments of that type which have solid electrodes at which a gas is absorbed or liberated from a liquid electrolyte and passes directly into a gas space.

In electrodes so employed I have discovered that no part of the electrode must be more than an extremely short distance from the gas reservoir, this distance being known as the radius of capillary action. I have found, with an electrode so situated, that when the current density applied is not too high, the gas, instead of appearing as a bubble, goes momentarily into a slightly supersaturated solution in the immediate proximity of the electrode and thereupon quickly diffuses over into the gas space because the latter is so near. In this way two advantages are gained. No gas gets away from the electrode into the body of the electrolyte as a supersaturated solution and is thus lost to registration. Again the electrode is not polarized as in the case when gas bubbles are actually formed. It is therefore the essence of my invention that no part of the active electrode shall be more than a very short distance, say the fraction of a millimeter, from the gas space so as to permit the gas which appears at the electrode to escape directly into the gas space instead of forming bubbles and possibly escaping into the body of the electrolyte and being lost for the purpose in hand. I therefore form my electrode, or rather the active part of it, in the shape of a line which is situated at the boundary between the liquid and the gas space and which never extends into the liquid for more than a very short distance, say the fraction of a millimeter.

I shall now proceed to describe briefly two typical forms of my electrode: and in order that the action of these may be more fully understood I shall describe them with reference to their use in electrolytic meters of what is known as the Hookham and Holden type. This type of meter will be found fully described in the specifications accompanying the British Letters Patent numbered 3,327 of the year 1905 and 10,614 of the year 1908. In applying my invention to such meters I may take advantage of the surface tension of the liquid electrolyte employed.

In the accompanying drawings:—Figure I illustrates the invention in its simplest form. Fig. II illustrates a practical form in which the area of contact is enlarged. Fig. III illustrates a case in which both the cathode and the anode are in accordance with the present invention.

Fig. I shows a simple form of the invention. In this figure, 1 is the measuring tube of the meter and 2 the electrolyte therein. 3 is a thimble of glass formed upon the inside of the measuring tube which thimble is lined with platinized platinum that is, platinum coated with platinum black or other suitable material to form the cathode 4. In the figure the size of the opening 5 is exaggerated but in practice it is of such size that the surface tension of the liquid will prevent it from entering into the internal space of the thimble. It will be seen therefore that the active part of the cathode consists of the edge 6 of the thimble at the opening 5, that this edge always lies in a line of contact between the electrolyte and the body of evolved gas contained in the interior of the thimble and that it is of the form of a ring in the form illustrated. This line is never more than a fraction of a millimeter broad in its extension into the liquid. Thus the gas evolved at this edge, in the line of contact between the electrolyte and the body of evolved gas, will at once diffuse into the body of gas and will neither go into supersaturation in the body of the liquid nor appear in the form of bubbles. As the gas continues to diffuse into the interior of the thimble the volume of gas therein will increase and from time to time a portion will be forced out and will rise in the form of a bubble. It will be understood however that while the bubble is forming as shown in the figure, the edge 6 constituting the effective part of the cathode, still lies in the line of contact of the electrolyte and the gas.

The form just described is unsuitable except for very small currents on account of the small area of the electrode in contact with the electrolyte. In order to increase this area the thimble 3 might be multiplied so as to form a honeycomb arrangement, each cell being lined with the platinized platinum or its equivalent. A preferred way of increasing the area however is to enlarge the internal space of the thimble 3 and to place across its mouth an electrode formed of platinized platinum, or its equivalent for the purpose, in the form of gauze, or a grill, or a perforated plate or foil or the equivalent thereof, the interstices or perforations being of such small size that the surface tension of the electrolyte prevents it from penetrating therethrough.

The form just described is illustrated in Fig. II. The thimble 3 instead of penetrating into the measuring tube as shown in Fig. I is formed on the outside thereof while a flat cathode 4 of gauze or its equivalent is arranged across its mouth. Here again it will be seen that the cathode lies in a line of contact between the electrolyte and a body of evolved gas. It does not project over a very small distance into the liquid and is in immediate proximity with the gas space. The gas liberated therefore diffuses at once into the body of gas and as the volume of the latter increases a portion is from time to time forced out of the largest hole in the gauze and escapes as a bubble to the gas at the top of the measuring tube.

The chief advantage of my electrode lies in its employment for the cathode. It may however be employed for the anode as well. Thus in Fig. III a meter is illustrated in which both the cathode 4 and the anode 7 are in accordance with my invention.

It will be seen that in the case of a gauze electrode the lines of contact cross or interlace with one another; that in the case of the honeycomb arrangement these lines consist of a number of hexagonal rings arranged in a tesselated manner; and that in the case of the perforated plate or foil the lines depend for their shape on the shape of the perforations. In this case only the edge of the perforations is effective and unless the area of the perforations be large in proportion to the area of the metal between the perforations this form of my electrode is not to be recommended.

Having thus described my invention what I claim as new and desire to secure by Letters Patent is:—

1. An electrolytic measuring instrument comprising a chamber formed with a gas space and containing a liquid electrolyte of a character to evolve a gas under electrolization, and an electrode whose active part is line-shape and is situated on the boundary between the liquid and the gas space, whereby the gas, instead of first appearing as bubbles on the electrode, diffuses at once into the gas space.

2. An electrolytic measuring instrument comprising a chamber formed with a gas space and containing a liquid electrolyte of a character to evolve a gas under electrolization, and an electrode whose active part is in the shape of a line which projects into the liquid for a fraction of a millimeter only and which is situated on the boundary between the liquid and the gas space, whereby the gas, instead of first appearing as bubbles on the electrode, diffuses at once into the gas space, substantially as described.

3. An electrolytic measuring instrument comprising a chamber formed with a gas space and containing a liquid electrolyte of a character to evolve a gas under electrolization and an electrode whose active part is in the form of a narrow line situated on the boundary between the liquid and the gas space and which line partially or wholly surrounds an opening through which the liberated gas may exude, the size of the opening being too small to admit the penetration of the liquid, whereby the gas instead of first appearing as bubbles on the electrode, diffuses at once into the gas space substantially as described.

4. An electrolytic measuring instrument comprising a chamber formed with a gas space and containing a liquid electrolyte of a character to evolve a gas under electrolization, and an electrode whose active part is in the form of a reticulation of lines situated on the boundary between the liquid and the gas space and which reticulation of lines surrounds openings through which the liberated gas may exude, the size of the openings being too small to permit the penetration of the liquid, whereby the gas, instead of first appearing as bubbles on the electrodes, diffuses at once into the gas space.

In witness whereof I have signed my name to this specification in the presence of two subscribing witnesses.

HENRY STAFFORD HATFIELD.

Witnesses:
 ANNA WINTER,
 HELENE BOTE.